US012654884B1

(12) United States Patent
Faizan et al.

(10) Patent No.: US 12,654,884 B1
(45) Date of Patent: Jun. 16, 2026

(54) SYSTEM FOR TUNNEL-BASED CAPTURE AND PROPULSIVE DISPOSAL OF SPACE DEBRIS

(71) Applicant: Mirza Faizan, Plano, TX (US)

(72) Inventors: Mirza Faizan, Plano, TX (US); Aayan Ali, Plano, TX (US); Ansh Pathak, Plano, TX (US); Ansh Gandhi, Plano, TX (US); Arini Kiran, Plano, TX (US); Siddharth Rao, Plano, TX (US); Tomisin Oluwaji, Plano, TX (US); Temitope Oluwaji, Plano, TX (US); Prishaa Jain, Plano, TX (US); Dhruv Karthik Alamuri, Plano, TX (US); Akansh Karthik, Plano, TX (US); Francis Paul Kurian, Plano, TX (US); Deen Adil Khan, Plano, TX (US); Advik Kothari, Plano, TX (US); Eashaan Dispenza, Plano, TX (US); Ariv Kiran, Plano, TX (US); Joseph Jacob Kurian, Plano, TX (US); Manan Sethi, New Delhi (IN); Ashaz Haque, Patna (IN); Mansoor Hasan Khan, Aligarh (IN)

( * ) Notice: Subject to any disclaimer, the term of this patent is extended or adjusted under 35 U.S.C. 154(b) by 0 days.

(21) Appl. No.: 19/354,745

(22) Filed: Oct. 9, 2025

(51) Int. Cl.
    *B64G 1/10*     (2006.01)
    *B64G 1/24*     (2006.01)
    (Continued)

(52) U.S. Cl.
    CPC .......... *B64G 1/1081* (2023.08); *B64G 1/242* (2013.01); *B64G 1/247* (2023.08); *B64G 1/286* (2013.01);
    (Continued)

(58) Field of Classification Search
    CPC ........ B64G 1/286; B64G 1/1081; B64G 1/68; B64G 4/00
    See application file for complete search history.

(56) References Cited

U.S. PATENT DOCUMENTS

| | | | | |
|---|---|---|---|---|
| 5,421,540 | A | * | 6/1995 | Ting .......................... B64G 1/22 244/158.1 |
| 8,469,314 | B2 | * | 6/2013 | Ganguli ............... B64G 1/1081 244/158.6 |

(Continued)

FOREIGN PATENT DOCUMENTS

| | | | | | |
|---|---|---|---|---|---|
| KR | 20250109176 | A | * | 7/2025 | ............... B64G 1/58 |
| WO | WO-2025171443 | A1 | * | 8/2025 | ............... B64G 1/68 |

*Primary Examiner* — Joshua J Michener
*Assistant Examiner* — Michael B. Kreiner

(57) ABSTRACT

The present disclosure relates to a tunnel-based space debris removal system that captures and compacts orbital debris for safe removal. The system includes a tunnel structure having a curved funnel-shaped portion oriented toward Earth and rotatably mounted on a cylindrical portion via a turntable. Incoming debris is directed through the funnel into a collision box, where an electromagnetic foil slows and confines the particles. A hydraulic compaction mechanism with pneumatically-driven piston arms applies high-pressure force to compress the debris against compression plates, forming dense pellets suitable for storage. A power subsystem, comprising solar panels and integrated energy storage, supplies operating power to all functional units. The system ensures efficient debris capture, controlled compaction, and energy autonomy, providing a reliable method for orbital debris mitigation and enhancing long-term space sustainability.

14 Claims, 4 Drawing Sheets

(51) Int. Cl.

| | |
|---|---|
| *B64G 1/28* | (2006.01) |
| *B64G 1/36* | (2006.01) |
| *B64G 1/44* | (2006.01) |
| *B64G 1/68* | (2006.01) |
| *B64G 3/00* | (2006.01) |
| *B64G 4/00* | (2006.01) |
| *G05D 1/689* | (2024.01) |
| *G05D 109/40* | (2024.01) |

(52) U.S. Cl.

CPC ................. *B64G 1/36* (2013.01); *B64G 1/44* (2013.01); *B64G 1/68* (2013.01); *B64G 3/00* (2013.01); *B64G 4/00* (2013.01); *G05D 1/689* (2024.01); *G05D 2109/40* (2024.01)

(56) References Cited

U.S. PATENT DOCUMENTS

| | | | | |
|---|---|---|---|---|
| 8,800,933 B2* | 8/2014 | Dunn | .................. | B64G 1/56 |
| | | | | 244/158.6 |
| 9,038,959 B2* | 5/2015 | Andoh | ................ | B64G 1/242 |
| | | | | 244/171.1 |
| 9,302,789 B2* | 4/2016 | Hanada | ................ | B64G 1/66 |
| 2011/0198446 A1* | 8/2011 | Knirsch | ................ | B64G 1/14 |
| | | | | 244/171.7 |
| 2013/0082146 A1* | 4/2013 | Kofford | ................ | B64G 4/00 |
| | | | | 244/158.7 |
| 2024/0319049 A1* | 9/2024 | Yano | ................ | G01N 1/2208 |
| 2025/0162731 A1* | 5/2025 | Sharma | ................ | B64G 1/56 |

* cited by examiner

100

200

300

SYSTEM FOR TUNNEL-BASED CAPTURE AND PROPULSIVE DISPOSAL OF SPACE DEBRIS

TECHNICAL FIELD

This disclosure relates to the field of space technology and, more specifically, to a system for removing space debris from its orbit.

BACKGROUND

The accumulation of space debris has become a serious issue for the safety and sustainability of operations in earth's orbit. Space debris comprises defunct satellites, spent rocket stages, and fragments from collisions or disintegrations. These objects travel at extremely high speeds, posing significant risks to functioning satellites, space stations, and future space missions. Current methods to remove debris, such as using harpoons, nets, or robotic arms, have shown limitations. These techniques often target only specific sizes or types of debris and require significant resources for deployment and operation. Furthermore, they lack scalability and are not energy-efficient, making them impractical for addressing the vast amount of debris in orbit. As a result, there is a pressing need for a new solution, a system that is reliable and capable of efficiently removing space debris on a large scale.

SUMMARY

By addressing the above requirements, the tunnel-based space debris removal system of the present disclosure provides a solution for addressing the growing challenge of uncontrolled space debris, which poses a significant threat to operational satellites, space missions, and the long-term sustainability of orbital environments. By integrating collection, collision management, and ejection subsystems within a unified tunnel structure, the system provides a controlled pathway for capturing and neutralizing debris instead of allowing it to remain in unpredictable orbits. The advantage of this approach lies in its precision and adaptability: debris is guided into the tunnel, trapped securely, and then redirected or neutralized using efficient mechanisms such as railgun launchers or thrusters. This not only reduces collision risks but also ensures safer orbital zones, extending the operational life of satellites and minimizing future costs associated with damage or mission failures.

The disclosed tunnel-based space debris removal system, comprises a tunnel structure having a wide opening at a first end configured to receive space debris, a closed second end, and a curved funnel-shaped portion between the first and second ends. The space debris removal system further comprises a debris detection mechanism that comprises radar units positioned along a midsection and nose of the tunnel structure, one or more optical imaging devices including wide-angle and telescopic cameras, and a communication relay unit that receives orbital tracking data from ground-based sensor facilities. The debris detection subsystem determines trajectory and orbital velocity of the space debris. The space debris removal system further comprises a rear-approach capture mechanism operatively coupled to the debris detection subsystem that receives information associated with the trajectory and orbital velocity of the space debris. The rear-approach capture mechanism calculates an intercept path of the tunnel structure that matches the trajectory and orbital velocity of the debris and controls one or more thrusters to position the tunnel structure along the trajectory of the space debris and approach the space debris from behind so as to minimize relative velocity between the space debris and the tunnel structure prior to capture of the space debris in the tunnel structure. The space debris removal system further comprises an orientation control subsystem comprising a plurality of control moment gyroscopes (CMGs) positioned on multiple sides of the tunnel structure. The orientation control subsystem reorients the tunnel structure toward the determined trajectory of the space debris. The space debris removal system further comprises an electromagnetic tungsten dust brake subsystem that comprises a tungsten alloy dust storage container, an electromagnetic dispersal unit configured to project tungsten dust into the trajectory of the space debris, and an electromagnetic recovery unit configured to recapture dispersed tungsten dust, the dust brake subsystem reduces velocity of the space debris prior to entry into the curved funnel-shaped portion. The space debris removal system further comprises a multi-layer deceleration and capture assembly disposed downstream of the first end, such that the multi-layer deceleration and capture assembly comprises an electromagnetic foil dispenser that wraps the space debris with a foil, and a collision box having a closed rear wall towards the second end of the tunnel structure and brings the space debris wrapped with the foil to a complete stop upon impact. The space debris removal system further comprises a hydraulic compaction mechanism positioned adjacent to the collision box and configured to compress the stopped space debris into dense pellets. The space debris removal system further comprises an ejection subsystem that directs the dense pellets in a selected direction for disposal or to generate propulsion, the ejection subsystem comprising at least one launch device and a mounting arrangement allowing adjustment of an ejection trajectory of the dense pellets. The space debris removal system further comprises a power subsystem comprising solar panels mounted on an exterior surface of the tunnel structure and energy storage devices integrated with the tunnel structure, the power subsystem provides operating power to the debris detection subsystem, the orientation control subsystem, the electromagnetic tungsten dust brake subsystem, the multi-layer deceleration and capture assembly, the hydraulic compaction mechanism, and the ejection subsystem.

In an embodiment, the space debris removal system further comprises a processor that executes a trained machine learning (ML) model using the trajectory and orbital velocity of the space debris to determine an orientation of the tunnel structure for capture of the space debris and to determine a reorientation of the tunnel structure after ejection of the compressed debris so as to direct the compressed debris toward a lower orbit.

In an embodiment, the ejection subsystem further comprises at least one railgun launcher including two parallel conductive rails, the at least one railgun launcher being mounted to an adaptive gun platform having at least two degrees of rotational freedom to aim the dense pellets toward a specific trajectory.

In an embodiment, the orientation control subsystem further comprises one or more sensors configured to detect a size of the space debris. The orientation control subsystem compares the detected size and the velocity of the space debris with predetermined threshold values, and, when at least one of the detected size and the velocity exceeds the predetermined threshold values, inhibit initiation of the capture of the space debris operation.

In an embodiment, the ejection subsystem further comprises at least one chemical thruster for directing the compressed debris in the selected direction.

In an embodiment, the mounting arrangement of the ejection subsystem rotates at least one launch device up to 360 degrees vertically or horizontally.

In an embodiment, the collision box further comprises an internal lining formed of shock-absorbing material to dissipate kinetic energy of the space debris upon impact.

In an embodiment, the hydraulic compaction mechanism further comprises a pneumatically-driven arm configured to press the space debris.

In an embodiment, the electromagnetic tungsten dust brake subsystem controls dispersion pattern, timing, and field polarity of the tungsten dust based on a size and the velocity of the space debris.

In an embodiment, the orientation control subsystem further comprises an iris-type shutter mechanism positioned at the first end of the tunnel structure and configured to selectively close the first end to prevent debris entry when the at least one of the detected size and the velocity exceeds the predetermined threshold values.

In an embodiment, the space debris removal system further comprises sensors integrated with the tunnel structure to detect damage and operational status of the tunnel structure.

In an embodiment, the space debris removal system further comprises one or more thrusters configured to de-orbit the tunnel structure based on the detection of the damage and the operational status of the tunnel structure by the sensors.

In an embodiment, the space debris removal system further comprises one or more thrusters configured to deploy the tunnel structure into the space.

In an embodiment, the one or more thrusters are further configured to de-orbit the tunnel structure after a predetermined operational period post deployment of the tunnel structure into the space.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
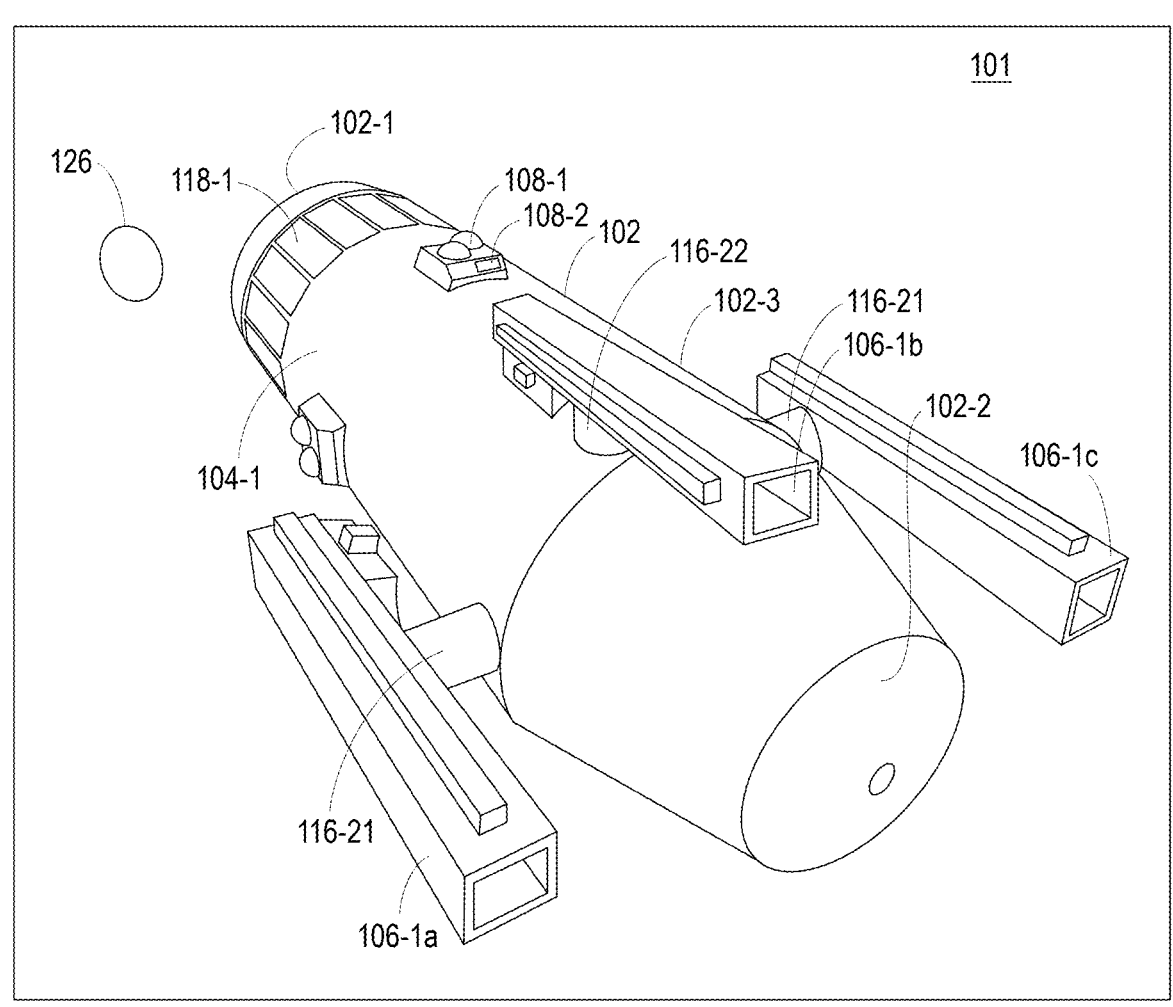
FIG. 1 illustrates a tunnel-based space debris removal system, in accordance with an embodiment of the present disclosure.

FIG. 1 illustrates a tunnel-based space debris removal system, in accordance with an embodiment of the present disclosure. With reference to FIG. 1, there is shown a diagram 100 of a tunnel-based space debris removal system 101. The system 101 is deployed in low Earth orbit and positioned such that its longitudinal axis is aligned with an orbital path of a targeted piece of space debris 126. The system 101 comprises a tunnel structure 102 that has a wide opening at a first end 102-1 for receiving space debris, a closed second end 102-2, and a curved, funnel-shaped portion 102-3 positioned between two ends. The curved, funnel-shaped portion 102-3 alters trajectory of the space debris 126 as it passes through the tunnel from the wide opening toward the narrow exit. The system 101 is shown FIG. 1, which may include one or more thruster 106-1a, 106-1b, and 106-1c. The system 101 shown further includes a debris detection mechanism 104, a plurality of control moment gyroscopes (CMGs) 108-1, a sensor 108-2, a mounting arrangement, and solar panels 118-1. A debris detection mechanism 104, positioned near forward end of the tunnel structure 102, continuously scans the surrounding orbital environment using integrated sensors such as optical cameras, radar, or lidar. Upon identifying a target object, the system 101 calculates a relative velocity, trajectory, and rotational characteristics of the space debris 126.

A rear-approach capture mechanism positions the system 101 behind the space debris 126 in its orbital path, allowing the system 101 to match its velocity and approach from a direction that minimizes collision risk. Once the system 101 is in a optimal position, an orientation control subsystem fine-tunes the angular alignment of the tunnel structure 102, compensating for microgravity drift, tumbling of the debris, and perturbations caused by other orbital forces.

Within the tunnel structure 102, an electromagnetic tungsten dust brake is positioned to deploy tungsten alloy dust in a controlled electromagnetic field.

The electromagnetic tungsten dust brake creates a kinetic drag effect that decelerates incoming space debris 126 without direct mechanical contact. Downstream of the electromagnetic tungsten dust brake, a multi-layer deceleration and capture assembly is arranged, comprising an electromagnetic foil dispenser that generates a repelling or slowing magnetic field, followed by a collision box that absorbs the remaining kinetic energy through deformable surfaces and energy-dissipating structures.

Once the space debris 126 is secured within the collision box, a hydraulic compaction mechanism is activated to compress and stabilize the space debris 126, reducing its volume for efficient storage. An ejection subsystem may then be engaged to release non-recoverable space debris 126 toward a designated orbital disposal trajectory, such as a controlled de-orbit path into the atmosphere of the Earth. The entire operation is powered by a power subsystem, which may include solar arrays or solar panels 118-1, onboard batteries, and power regulation circuitry.

Further, a processor, in communication with a memory containing an ML model, coordinates the sequence of detection, approach, deceleration, and capture. The ML model refines target identification and motion prediction over time, improving capture success rates in varied debris conditions. A proper communication interface maintains a continuous link with ground-based control stations, enabling real-time monitoring, command input, and mission updates throughout the debris removal process.

Figure 2:
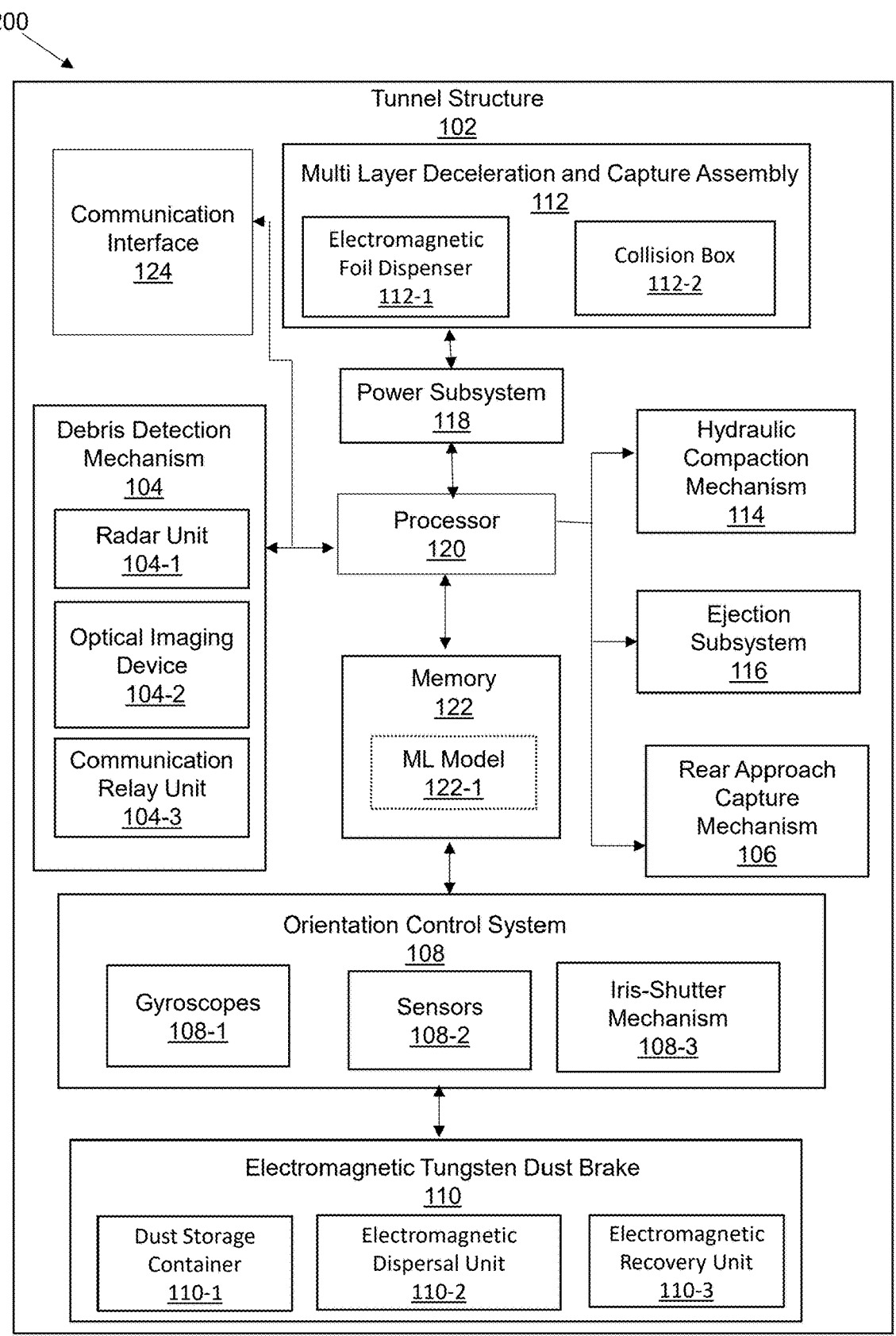
FIG. 2 illustrates a block diagram of a tunnel-based space debris removal system, in accordance with an embodiment of the present disclosure.

FIG. 2 illustrates a block diagram of a tunnel-based space debris removal system, in accordance with an embodiment of the present disclosure. With reference to FIG. 2, there is shown a block diagram 200 of a tunnel-based space debris removal system 101. The system 101 comprises the tunnel structure 102, the debris detection mechanism 104, a rear approach capture mechanism 106, an orientation control system 108, an electromagnetic tungsten dust brake 110, the multi-layer deceleration and capture assembly 112, a hydraulic compaction mechanism 114, an ejection subsystem 116, the power subsystem 118, a processor 120, the memory 122, and the communication interface 124. The debris detection mechanism 104 comprises a radar unit 104-1, an optical imaging device 104-2, and a communication relay unit 104-3. The orientation control system 108 comprises the plurality of control moment gyroscopes (CMGs) 108-1, the sensors 108-2, and an iris-shutter mechanism 108-3. In an example, the processor 120 and the memory 122 may be integrated with the processor 120 to carry out multiple functions as detailed further. The electromagnetic tungsten dust brake 110 comprises a tungsten alloy dust storage container 110-1, an electromagnetic dispersal unit 110-2, and an electromagnetic recovery unit 110-3. The multi-layer deceleration and capture assembly 112 comprises an electromagnetic foil dispenser 112-1, and a collision box 112-2. The memory 122 is integrated with a machine learning (ML) model 122-1.

The system 101 operates as an integrated orbital platform to intercept and safely capture the space debris 126. The tunnel structure 102 includes a wide opening at the first end 102-1 for receiving space debris, the closed end at the second end 102-2, and the curved, funnel-shaped portion 102-3 positioned between the two ends. The curved, funnel-shaped portion 102-3 alters the trajectory of the space debris as it passes through the tunnel from the wide opening toward the narrow exit, ensuring that the space debris 126 entering the tunnel structure 102 is redirected without generating excessive lateral forces or rebound effects.

Detection of the space debris 126 is performed by the debris detection mechanism 104 positioned along the tunnel structure 102. In this embodiment, the radar units 104-1 are mounted at both the midsection and nose section of the tunnel structure 102, enabling continuous acquisition of real-time positional and velocity data for approaching the space debris 126. Complementing the radar capability, an optical imaging device 104-2, including wide-angle or telescopic optical cameras capture captures high-resolution imagery for accurate size estimation and surface characterization. The debris detection mechanism 104 is further integrated with a communication relay unit 104-3 that receives orbital tracking information from ground-based sensor facilities, allowing the system 101 to anticipate the approach of target space debris 126 well in advance. By fusing radar measurements, optical imaging, and external tracking data, the debris detection mechanism 104 precisely calculates parameters like the trajectory or orbital velocity of the space debris 126.

Once the parameters of the space debris 126 are established, the rear-approach capture mechanism 106 processes the trajectory and velocity data to compute an intercept path that aligns the orbital motion of the tunnel structure 102 with that of the space debris 126. The rear-approach capture mechanism 106 comprises thrusters 106-1a, 106-1b, and 106-1c integrated with the tunnel structure 102 and are commanded by the processer 120 to maneuver the tunnel structure 102 into position behind the space debris 126, matching its speed and direction. In one embodiment, the thrusters 106-1a, 106-1b, and 106-1c may be a part of the rear-approach capture mechanism 106. However, in one embodiment, the thrusters 106-1a, 106-1b, and 106-1c may be a part of the ejection subsystem 116. In another embodiment, the thrusters 106-1a, 106-1b, and 106-1c may be a part of the rear-approach capture mechanism 106.

To maintain alignment with the path of the space debris 126, the orientation control system 108 is deployed. The orientation control system 108 uses multiple control moment gyroscopes (CMGs) 108-1 positioned at different points on a frame of the tunnel structure 102 to reorient the structure quickly and accurately in three-dimensional space, ensuring the wide opening remains perfectly aligned with the debris approach vector.

Figure 3:
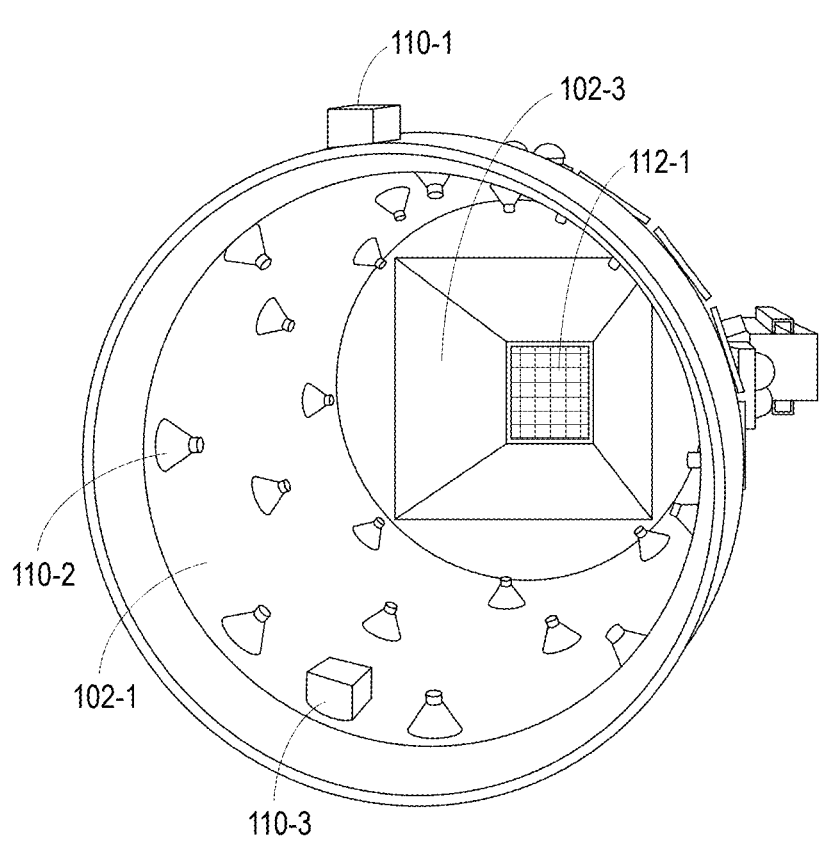
FIG. 3 illustrates a front view of a tunnel structure, in accordance with an embodiment of the present disclosure.

Prior to entry into the funnel-shaped portion, the electromagnetic tungsten dust brake subsystem 110 reduces the velocity of the space debris 126. The electromagnetic tungsten dust brake subsystem 110 stores tungsten alloy dust within the tungsten alloy dust storage container 110-1, and the electromagnetic dispersal unit 110-2 disperses it electromagnetically into the trajectory of the space debris 126 (as shown in FIG. 3). As the space debris 126 interacts with the tungsten particles, kinetic energy is dissipated, slowing it down. Further, the electromagnetic recovery unit 110-3 then recaptures the dispersed tungsten dust, minimizing material loss and preventing contamination of orbital space.

Downstream of the wide end of the tunnel structure 102, the multi-layer deceleration and capture assembly 112 further slows and contains the space debris 126. In this embodiment, the electromagnetic foil dispenser 112-1 layer induces eddy currents in conductive space debris 126, generating resistive braking forces. Simultaneously, the electromagnetic foil dispenser 112-1 can wrap around the space debris 126 to secure it. Finally, deceleration of the space debris 126 occurs within the collision box 112-2 featuring a closed rear wall. At this point, captured space debris 126, already slowed by preceding braking stages, undergoes residual velocity reduction to ensure complete stoppage. Therefore, eliminating any remaining kinetic energy that could cause the space debris 126 to rebound or damage the internal tunnel structure 102, thereby ensuring secure containment for subsequent processing or disposal.

Once immobilized, the space debris 126 is transferred to the hydraulic compaction mechanism 114 located adjacent to the collision box 112-2. Here, the space debris 126 is crushed into dense pellets, optimizing its mass-to-volume ratio for storage or disposal. Following compaction, the ejection subsystem 116 directs the pellets away from the tunnel structure 102 in a controlled manner. The ejection subsystem 116 features at least one launch device and a mounting arrangement that can adjust the ejection angle, allowing the pellets to be sent into a disposal trajectory or used for propulsion in certain orbital maneuvers.

In an embodiment, the tunnel structure 102 is equipped with the power subsystem 118. The power subsystem 118 includes solar panels 118-1 mounted externally to capture solar energy and energy storage units integrated into the tunnel structure 102. The power subsystem 118, powers the debris detection mechanism 104, the orientation control system 108, the electromagnetic tungsten dust brake 110, the multi-layer deceleration and the multi-layer deceleration and capture assembly 112, the hydraulic compaction mechanism 114, and the ejection subsystem 116, enabling the system 101 to function autonomously for extended periods in orbit.

In an embodiment, the tunnel structure 102 of the system 101 includes a wide opening at a first end 102-1 dimensioned to receive the space debris 126 of varying sizes and a narrow exit at the second end 102-2 that directs space debris 126 toward downstream processing. Between these ends, the curved funnel-shaped portion 102-3 redirects the incoming debris trajectory toward the central axis for controlled capture. The curved funnel-shaped portion 102-3 is oriented toward the Earth and is rotatably mounted relative to a cylindrical portion of the tunnel structure 102 via a turntable assembly, enabling precise entry-path alignment following orientation adjustments. A motorized bearing integrated with the turntable provides controlled angular positioning of the funnel, allowing adaptation to varying debris approach vectors in orbit. The tunnel structure 102 is fabricated from high-strength alloys combined with composite panels to withstand repeated high-energy impacts and extreme thermal variations encountered during orbital operations.

In an embodiment, the tunnel structure 102 includes the curved funnel-shaped portion 102-3 positioned at its forward end, the funnel being oriented toward Earth to maximize the capture of incoming space debris 126. The curved funnel-shaped portion 102-3 is mechanically connected to a cylindrical portion of the tunnel structure 102 that houses the internal subsystems, including the electromagnetic foil dispenser 112-1 and collision box 112-2. A turntable mechanism may be disposed between the curved funnel-shaped portion and the cylindrical portion, allowing the funnel to rotate independently relative to the cylindrical body. The turntable arrangement provides precise orientation control, ensuring that the funnel remains optimally aligned with the trajectory of space debris 126 while maintaining stability of the cylindrical portion that accommodates the supporting subsystems.

In an embodiment, the communication interface 124 serves as the data exchange gateway between the system 101 and external control entities, such as ground stations, mission control centers, or another spacecraft operating within the same orbital network. Functionally, the communication interface 124 may be implemented as a high-gain directional antenna, phased-array antenna system, or optical communication terminal, depending on the mission's range, data rate requirements, and environmental conditions. The communication interface 124 enables intra-communication, via wired or wireless communication, among the debris detection mechanism 104, the rear approach capture mechanism 106, the orientation control system 108, and the processor 120. All the collected information is then encoded and transmitted to ground control for real-time monitoring, mission updates, and operational analysis. Conversely, the communication interface 124 receives operational instructions, updated debris coordinates, and mission parameters from the ground station or networked satellites, and relays them to the processor 120 for execution. The communication interface 124 may also support inter-satellite links using protocols like SpaceWire, CCSDS, or laser communication channels, enabling coordination with cooperative spacecraft that can provide supplementary tracking data or assist in multi-vessel debris capture operations. By maintaining this continuous bidirectional data flow, the communication interface 124 ensures synchronized operation between the space debris removal system and external control infrastructures, supporting timely decision-making and mission adaptability.

In an embodiment, the debris detection mechanism 104 determines the trajectory and orbital velocity of the space debris 126 before interception with the tunnel structure 102. The debris detection mechanism 104 incorporates radar units 104-1 positioned along the midsection and the nose of the tunnel structure 102, enabling continuous real-time tracking of objects approaching the operational zone of the system 101. Each of the radar units 104-1 emits pulsed radio frequency signals toward the suspected location of the space debris 126, and the returning echoes are analysed to calculate both the distance and relative velocity of the target (space debris 126) using time-of-flight and Doppler shift measurements.

Complementing the radar-based tracking, the optical imaging devices 104-2 provide broad field-of-view monitoring for early visual detection, including telescopic cameras that deliver an optical image of the environment surrounding the tunnel structure 102. Data from the optical image is processed through image-processing algorithms, such as edge detection and shape recognition, to differentiate genuine debris from other orbital objects or false positives caused by background reflections. In an example, the optical image may be processed by the processor 120 using the ML model 122-1. The ML models 122-1 like convolutional neural networks (CNNs) and vision transformers (ViTs) can be utilized for optical image processing.

The communication relay unit 104-3 integrated within the debris detection mechanism 104 receives orbital tracking data from ground-based sensor facilities. The orbital tracking data may include predicted orbital elements and positional updates, which are cross-referenced with locally acquired radar and camera inputs. All available datasets, radar readings, optical imagery, and ground-supplied orbital data, are combined and processed using predictive algorithms to determine the trajectory, orbital velocity, and potential collision path of the space debris 126 relative to the tunnel structure 102. In an example, the processor 120 may process echoes returning from the space debris 126 to the radar unit 104-1, to determine a distance between the space debris 126 and the tunnel structure 102. The processor 120 may further analyze the optical images captured by the optical imaging devices 104-2 to recognize an object as the space debris 126. The processor 120 may utilize ML model 122-1 to classify the optical images as comprising of actual debris or not, in order to reduce the false alarms. The ML model 122-1 may inform the processor 120 whether the objects detected in the optical images are debris or not. The processor 120 may further determine the trajectory and the orbital velocity of the space debris 126 using the distance between the space debris 126 and the tunnel structure 102, processing of the optical images by the ML model 122-1, and the orbital tracking data received from the ground-based sensor facilities.

In an embodiment, the processor 120, in conjunction with memory 122 housing the trained ML model 122-1, continuously fuses sensor inputs, including radar-based range and Doppler measurements, optical tracking imagery, and any received telemetry or ephemeris data from cooperative satellites. These fused data streams are processed to derive precise motion parameters of the target space debris 126, including its three-dimensional position vector, instantaneous velocity vector, angular velocity, orbital velocity, orbital inclination, and predicted time-to-intercept relative to the tunnel structure 102. The ML model 122-1 is trained on historical datasets of debris capture missions and synthetic orbital simulations, uses these motion parameters to classify the approach of the space debris 126 profile, and predicts the optimal capture orientation.

The memory 122 stores ML model 122-1 that may include, for example, a convolutional neural network (CNN) for processing radar and optical imagery, a recurrent neural network (RNN) or long short-term memory (LSTM) network for predicting debris trajectories over time, and a reinforcement learning (RL) model for optimizing tunnel orientation and reorientation strategies based on real-time feedback. These ML models 122-1 are trained on historical orbital debris datasets, simulated debris approach scenarios, and satellite maneuvering data to ensure prediction and decision-making performance in varying orbital conditions.

Upon receiving the trajectory and orbital velocity data of the space debris 126, the processor 120 runs the ML model 122-1 to generate a control output specifying the three-axis orientation angles i.e. pitch, yaw, and rolloff the tunnel structure 102. This orientation is calculated so that the central axis of the tunnel structure 102 is collinear with the debris's incoming trajectory at the predicted intercept point, accounting for microgravity drift, relative angular motion, and potential rotational tumbling of the space debris 126. The output from the ML model 122-1 may be passed through a guidance solution algorithm, which cross-checks the predicted orientation against real-time sensor feedback to ensure sub-degree alignment accuracy. The guidance solution algorithm drives the actuation of the tunnel's attitude control thrusters 106-1a, 106-1b and 106-1c, resulting in fine-tuned adjustments that maintain the capture aperture in an optimal interception posture until the space debris 126 is secured within the tunnel structure 102.

Following debris capture and compression, the processor 120 reinitializes the ML model 122-1 with updated data of the system 101, including the new mass distribution of the tunnel structure 102, current orbital parameters, and the compressed debris' ejection vector requirements. The ML model 122-1 predicts the reorientation sequence needed to align the tunnel aperture toward a calculated ejection trajectory that will impart a retrograde velocity component to the debris upon release. This retrograde component is precisely controlled to reduce the debris's perigee, thereby placing it into a lower decay orbit. The processor 120 may generate a sequential thruster-firing plan to execute this reorientation, ensuring that the center of mass of the tunnel structure 102 remains stable during maneuvering. The reorientation is continuously monitored using the same fused sensor inputs, with the ML model 122-1 adapting control commands in real-time to correct for any unmodeled disturbances such as micro-collisions with residual particles.

In an embodiment, the orientation control subsystem 108 reorients the tunnel structure 102 in three-dimensional space to align with the predicted trajectory of the space debris 126. The plurality of CMGs 108-1 positioned on multiple sides of the tunnel structure 102 may provide precise 3-axis stabilization and pointing control. The CMGs 108-1 generate gyroscopic torques that alter the angular momentum of the tunnel structure 102, enabling rapid and stable orientation toward the debris path. The orientation control subsystem 108 may operate in a closed-loop feedback mode, continuously adjusting orientation to account for debris drift, microgravity perturbations, and platform motion, ensuring that the capture aperture remains aligned with the debris entry vector.

The orientation control subsystem 108 comprises the sensors 108-2 for detecting the size and velocity of the space debris 126, which may include proximity sensors, optical ranging devices, LIDAR units, stereoscopic cameras, or radar-based measurement units, and determines the physical dimensions and relative approach velocity of incoming space debris 126. The sensors 108-2 measure the size of the space debris 126 by transmitting a detection signal toward the debris and analysing the reflected signal for range and cross-sectional profile, while Doppler shift analysis or successive range measurements determine the relative velocity. The detected size and velocity of the space debris 126 are compared against predetermined threshold values stored in the system 101 memory 122, representing the maximum allowable debris size and velocity for safe capture. The predetermined threshold value is a predefined numerical limit set within the system 101 against which real-time measured parameters are compared to determine whether a specific operational action should be triggered. For example, a mission may define a size threshold of 0.75 meters in maximum cross-sectional diameter and a velocity threshold of 2.5 meters per second relative velocity, based on structural load capacity, capture response time, and material strength analysis.

When the measured space debris 126 parameters remain within the allowable predetermined threshold value, a velocity-matching algorithm may be integrated within the orientation control system 108 calculates a firing sequence for the three thrusters 106-1a, 106-1b, and 106-1c mounted around the tunnel structure 102 (as shown in FIG. 1). The thrusters 106-1a, 106-1b, and 106-1c are mounted on the tunnel structure 102 and are then commanded by the processor 120 based on fused trajectory and velocity data from the debris detection 104. The thrusters 106-1a and 106-1c are aligned with the tunnel longitudinal axis to provide back-and-forth translational movement for approach and withdrawal along the orbital path, while thruster 106-1b is positioned to provide both fine angular adjustments for attitude control of the capture aperture and lateral orientation control in the left and right directions. The velocity-matching algorithm may compute the difference between the debris velocity vector and the relative motion of the tunnel structure 102 and then generates thrust commands to gradually nullify the relative velocity. The ML model 122-1, which may be implemented as a deep reinforcement learning network or a gradient-boosted decision tree ensemble, continuously refines the velocity-matching and thruster firing logic based on historical capture data, debris shape variations, and environmental influences.

If the detected debris size or velocity exceeds the stored predefined threshold value, the orientation control system 108 may generate an inhibition signal that immediately triggers closure of the iris-type shutter mechanism 108-3, activated by the processor 120 and located at the first end 102-1 of the tunnel structure. The iris-type shutter mechanism 108-3 consists of overlapping, radially movable blades, may be driven by synchronized servo actuators, which are activated by the processor 120 via the communication interface 124, which converge toward the centre of the tunnel structure 102 to form a sealed barrier. The closure may occur within 0.5 seconds of threshold breach detection, preventing hazardous debris from entering the tunnel and protecting downstream components from potential damage.

In an embodiment, the rear-approach capture mechanism 106 receives information about the trajectory and orbital velocity of the space debris 126 from the debris detection mechanism 104 via the communication interface 124. The rear-approach capture mechanism 106 determines an intercept path of the tunnel structure 102 that matches the orbital velocity of the space debris 126 by continuously comparing position and velocity data obtained from the debris detection mechanism 104 with the current motion parameters such as relative position vector, relative velocity vector, or acceleration of the tunnel structure 102. Based on this comparison, the rear-approach capture mechanism 106 computes precise velocity adjustment requirements to align the tunnel structure 102 with the orbital path of the space debris 126.

Three thrusters 106-1a, 106-1b, and 106-1c are utilized to execute calculated trajectory and orientation corrections, including forward propulsion, left-right orientation control, and vertical stabilization. The thruster 106-1a and thruster 106-1c are mounted on opposite sides of the tunnel structure 102, providing lateral orientation control for leftward and rightward adjustments, respectively. The thruster 106-1b is positioned to enable longitudinal orientation control, adjusting the forward or backward thrust along the main axis of the tunnel structure 102. When a navigation algorithm, such as proportional-integral-derivative (PID) control or linear quadratic regulator (LQR) detects any lateral deviation, it commands asymmetrical firing of these thrusters 106-1a, 106-1b, and 106-1c. The navigation algorithm continuously compares velocity vectors and computes required acceleration/deceleration pulses. The navigation algorithm is implemented by the processor 120 for using trajectory calculations stored in the memory 122. The navigation algorithm receives real-time tracking data from the debris detection mechanism 104, including radar measurements and optical camera inputs, along with orbital parameters from ground stations via the communication interface 124. The processor 120 runs these calculations continuously during approach maneuvers, sending the thrusters 106-1a, 106-1b, and 106-1c control commands to adjust the position and velocity of the tunnel structure 102. The coordinated firing of these thrusters 106-1a, 106-1b, and 106-1c allows the tunnel structure 102 to make fine adjustments in position and orientation, enabling an approach from behind the space debris 126. Approaching from the rear minimizes relative velocity, as both the tunnel structure 102 and the space debris 126 travel in nearly identical orbital directions, thereby reducing impact forces at the point of capture.

The thrusters 106-1a, 106-1b, and 106-1c, the launch device, and the railgun launcher of the ejection subsystem 116 all operate on a common functional principle, such that a directed propulsion force is generated to alter motion in space. The launch device in the form of the railgun launcher as part of the system 101. The railgun launcher operates on the principle of electromagnetic propulsion, where two parallel conductive rails form a track for accelerating conductive projectiles, such as dense pellets. When a high-current pulse is applied across the rails, a strong electromagnetic field is generated. The electromagnetic field interacts with the conductive projectile, producing Lorentz forces that rapidly accelerate the projectile along the rails and eject it at high velocity from the launcher. The railgun launcher may be mounted onto an adaptive gun platform. The platform may provide at least two degrees of rotational freedom, commonly pitch and yaw, through actuated joints, rotary mechanisms, or gimbal-like structures. By adjusting these rotational axes, the system 101 can precisely aim the railgun barrel in three-dimensional space. This ensures that the dense pellets are projected along a trajectory that intersects with the target debris. In the case of the rear-approach capture mechanism 106, controlled bursts from the thrusters 106-1a, 106-1b, and 106-1c generate incremental velocity changes, which are calculated to bring the tunnel structure 102 into synchronized motion with the space debris 126. By reducing the speed difference prior to entry into the curved funnel-shaped portion 102-3, the rear-approach capture mechanism 106 ensures stable capture without excessive mechanical stress on downstream deceleration and capture components.

In an embodiment, the electromagnetic tungsten dust brake subsystem 110 decelerates incoming space debris 126 prior to its entry into the curved funnel-shaped portion 102-3 of the tunnel structure 102, thereby reducing impact loads and improving capture safety. The processor 120 activates the electromagnetic tungsten dust brake subsystem 110 via communication interface 124 to control dispersion pattern, timing, and field polarity of the tungsten dust based on the size and the velocity data of the space debris 126. The electromagnetic tungsten dust brake subsystem 110 includes the tungsten alloy dust storage container 110-1 to hold fine, conductive tungsten alloy particles in a controlled environment to prevent agglomeration or unwanted discharge (as shown in FIG. 3). These particles are selected for their high density, conductivity, and resistance to vaporization in space conditions.

The electromagnetic dispersal unit 110-2 projects tungsten dust into the trajectory of the incoming debris by generating a rapidly changing magnetic field through high-current electromagnetic coils. When activated, the coils may create a controlled Lorentz force that accelerates the tungsten particles from the tungsten alloy dust storage container 110-1 into space at a calculated velocity and in a precise dispersion pattern. The projection is synchronized with the debris approach so that the dust cloud occupies the same spatial path as the debris at the moment of interception. The dispersion pattern is shaped by modulating coil current waveform and polarity, ensuring that the tungsten particles are distributed over the debris' cross-sectional profile for maximum surface interaction.

Once the tungsten dust cloud interacts with the space debris 126, the plurality of the electromagnetic recovery units 110-3, arranged circumferentially around the debris path, generates targeted magnetic fields to recapture the dispersed tungsten particles. These electromagnetic recovery units 110-3 employ synchronized magnetic field gradients that direct the conductive particles toward collection channels, where they are filtered, stored, and made available for reuse. The field strength, polarity, and activation timing of each electromagnetic recovery units 110-3 are coordinated so that dust is retrieved efficiently without interfering with debris capture or altering its desired trajectory.

The braking effect of the electromagnetic tungsten dust brake subsystem 110 is achieved when the tungsten particles, upon collision with the debris surface, transfer momentum through micro-impacts and generate localized drag. Additionally, because tungsten is conductive, the electromagnetic field generated during dispersion induces eddy currents in the debris body (if metallic), which produce resistive electromagnetic drag.

The the electromagnetic tungsten dust brake subsystem 110 may also include a control circuit that regulates the dispersion pattern, timing, and field polarity of the tungsten dust based on the detected size and velocity data of the debris, as provided by orientation control system 108. For larger debris or higher velocities, the control logic increases particle density in the dust cloud, adjusts coil energization to widen the dispersion angle, and modulates field polarity to maximize interaction time. For smaller or slower debris, the electromagnetic tungsten dust brake subsystem 110 reduces dust density and narrows the dispersion to conserve material. This adaptive control ensures that braking force is optimized for each engagement scenario while minimizing resource consumption.

In an embodiment, the multi-layer deceleration and capture assembly 112 decelerates and restrains the space debris 126 as it transitions through the multi-layer deceleration and capture assembly 112. In operation, the space debris 126 enters the funnel-shaped approach path, after which it becomes wrapped by the electromagnetic foil dispenser 112-1. The electromagnetic foil dispenser 112-1 generates a strong and controlled electromagnetic field that induces eddy currents in conductive space debris 126, producing resistive forces that slow its motion and simultaneously create a wrapping effect that stabilizes its trajectory. The electromagnetic wrapping ensures that the space debris 126 maintains a predictable orientation and path as it continues forward.

Following this controlled deceleration, the space debris 126 enters into the collision box 112-2. The collision box 112-2 includes a closed rear wall that directly absorbs the residual kinetic energy of the debris upon impact, bringing it to a complete stop. Interior of the collision box 112-2 is lined with shock-absorbing foam or equivalent material, which distributes and dissipates the remaining impact forces, thereby preventing rebound or secondary fragmentation. The combined effect of electromagnetic braking, controlled wrapping, and energy absorption ensures that even high-velocity debris is reliably slowed, stabilized, and captured without compromising the structural integrity of the multi-layer deceleration and capture assembly 112.

Figure 4:
FIG. 4 shows a rear elevational view showing internal components of the tunnel structure of FIG. 1, in accordance with an embodiment of the present disclosure.
Figure 4:
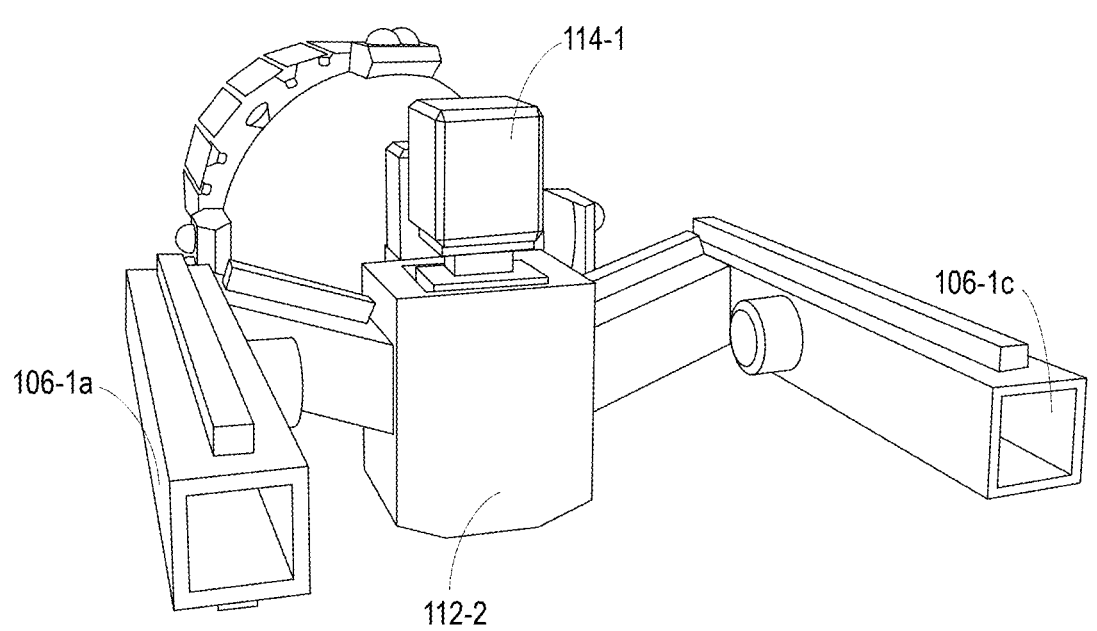

In an embodiment, the hydraulic compaction mechanism 114 is positioned adjacent to the collision box 112-2, permanently reducing the volume of captured space debris 126 by compacting it into dense, manageable pellets. Once the debris is fully arrested within the collision box 112-2. The pneumatically-driven arm 114-1 may be driven by an actuator that is controlled and activated by the processor 120. The pneumatically-driven arm 114-1 engages to transfer the debris into the compaction chamber of the hydraulic compaction mechanism 114 (as shown in FIG. 4). The pneumatically-driven arm 114-1 operates under high-pressure pneumatic control, allowing rapid and precise movement of the space debris 126 while minimizing the risk of uncontrolled displacement.

Within the compaction chamber, the one or more pneumatically-driven arms 114-1 are capable of applying pressures may be up to 5000 PSI against the space debris 126. The pneumatically-driven arm 114-1 drives compression plates that reshapes irregularly sized and fragmented space debris 126 into uniformly dense pellets. The shaping function of the compression plates not only reduces the volume of the space debris 126 but also facilitates long-term storage and potential recycling by producing standardized pellet dimensions. The chamber geometry ensures that the applied force is evenly distributed across the debris surface, thereby maximizing compaction efficiency and minimizing wear on the structural components of the mechanism.

The hydraulic compaction mechanism 114 may operate in sequential stages: initially, the space debris 126 is positioned against a stationary back plate, after which the pneumatic piston arms exert forward pressure. Once peak compaction force is achieved, the compression plates lock into position to stabilize the formed pellet. The hydraulic compaction mechanism 114 may further include an automated release slot that discharges the compacted pellet into a collection bay, enabling continuous operation of the capture assembly without manual intervention.

The hydraulic compaction mechanism 114 ensures that large, high-volume space debris 126 is transformed into dense pellets, thereby reducing storage requirements, mitigating risks of re-fragmentation, and enabling efficient downstream processing. The combination of pneumatic actuation, hydraulic-level pressure delivery, and precision compression plates ensures reliable long-term functionality in the harsh conditions of space.

In an embodiment, the ejection subsystem 116 propels compacted pellets of the space debris 126 out of the rear approach capture mechanism 106 and directs them along controlled trajectories for safe disposal or redirection. The ejection subsystem 116 includes at least one railgun launcher and optionally a chemical thruster as an alternative propulsion mechanism. The ejection subsystem 116 is mounted on the rotatable platform or mounting arrangement, which provides precise control over the launch orientation.

In operation, once the hydraulic compaction mechanism 114 has pressed the captured space debris 126 into dense pellets, the ejection subsystem 116 is activated. The ejection subsystem 116 utilizes the railgun launcher or one or more of the thrusters 106-1a, 106-1b, or 106-1c which work by delivering high-current pulse across its rails. As a result, the railgun launcher accelerates the pellet along the rail path at extremely high velocity. This electromagnetic acceleration ensures rapid expulsion without reliance on consumable propellants. The railguns are constructed of high-conductivity materials capable of withstanding repeated discharges, and their spacing is adjustable to accommodate pellets of varying dimensions and densities.

As an alternative mode, the ejection subsystem 116 may incorporate a chemical thruster, which is activated when electromagnetic propulsion is not optimal, such as in cases of system redundancy, failure, or specific mission requirements. The chemical thruster is capable of directing pellets by generating controlled combustion exhaust, thereby imparting momentum to the ejected pellet. This provides flexibility in propulsion methods and ensures continuity of operation under varying mission conditions.

Both the railgun launcher and the chemical thruster are mounted on the rotatable mounting arrangement controlled by the processor 120 integrated within the ejection subsystem 116. The mounting arrangement provides at least two degrees of freedom for trajectory control. The mounting arrangement may include a mounting arrangement 116-21 associated with the thruster 106-1a and the thruster 106-1c. The mounting arrangement may further include a mounting arrangement 116-22 associated with the thruster 106-1b. Specifically, the mounting arrangements 116-21 provide a 360-degree motion to the thruster 106-1a and 106-1c in a vertical plane. The mounting arrangement 116-22 provides a 360-degree motion to the thruster 106-1*b* in a horizontal plane. This degree of adjustability ensures that pellets can be directed with extreme precision to predetermined orbital paths or to controlled re-entry vectors for atmospheric burn-up. The structural configuration of the mounting arrangement provides mechanical stability, vibration dampening, and controlled actuation through servo motors or hydraulic actuators. Through this combined arrangement of electromagnetic and chemical propulsion mechanisms, supported by a fully rotatable mounting structure, the ejection subsystem 116 ensures reliable, adaptable, and precise expulsion of space debris pellets.

In an embodiment, the power subsystem 118 provides continuous and reliable energy to all active components of the debris capture and ejection system. A plurality of solar panels 118-1 are mounted on an exterior surface of the tunnel structure in orientations optimized for maximum solar exposure during orbital operation. The solar panels 118-1 convert incident solar radiation into electrical power using high-efficiency photovoltaic cells, ensuring sustainable energy generation in space without dependency on consumable fuels.

The electrical output from the solar panels 118-1 is routed through power conditioning circuitry that stabilizes voltage and regulates current flow, thereby protecting sensitive subsystems from fluctuations in power levels. Integrated energy storage devices, such as advanced lithium-ion batteries or supercapacitors, are structurally embedded within the tunnel framework to minimize space usage while supplying stored energy during eclipse phases or when solar radiation is insufficient.

The stored energy within the subsystem 118 is distributed across all mission-critical modules, including the electromagnetic foil dispenser 112-1, the collision box 112-2, the hydraulic compaction mechanism 114, and the ejection subsystem 116, ensuring uninterrupted operation of debris capture, compaction, and pellet ejection sequences. The modular integration of the solar panels 118-1 and energy storage units further enables redundancy, permitting failsafe operation in the event of localized panel or storage degradation.

Therefore, the system 101 incorporates a deployable tunnel structure 102 equipped with thrusters 106-1*a*, 106-1*b*, and 106-1*c*, the ejection subsystem 116, and the debris detection mechanism 104 supported by multiple sensors 108-2 and the processor 120. The system 101 autonomously detects, captures, and redirects space debris 126 by executing precise orbital and velocity adjustments through coordinated thruster control and real-time sensor feedback. Collectively, these integrated mechanisms enable safe, efficient, and intelligent debris mitigation and orbit maintenance across varying space environments.

In an alternative embodiment, the sensors 108-2 are integrated with the tunnel structure 102 to detect damage and monitor the operational status of the tunnel structure 102 during debris capture and orbital maneuvers. The sensors 108-2 are integrated to ensure the operational status and functionality of the tunnel structure 102 in capturing and guiding space debris 126. The operational status may refer to the real-time functional condition and performance state of the tunnel structure 102, determined by monitoring key parameters such as structural integrity, thermal balance, vibration levels, and propulsion responsiveness. It indicates whether the tunnel structure 102 and its subsystems, including thrusters 106-1*a*, 106-1*b*, and 106-1*c*, as well as sensors 108-2, are operating within predefined performance thresholds necessary for maintaining a stable orbit and effectively capturing debris. These sensors 108-2 detect damage and monitor various parameters to ensure the tunnel structure 102 remains effective. These sensors 108-2 may comprise impact sensors, strain gauges, accelerometers, gyroscopes, temperature sensors, optical sensors, and acoustic sensors.

The impact sensors may detect collisions with space debris 126 and measure the force and location of impacts. They provide real-time data on the structural integrity of the tunnel structure 102 and help in identifying areas that may require maintenance or repair. The strain gauges measure the deformation or strain of the tunnel structure 102. By monitoring changes in strain, these sensors can detect potential structural weaknesses or damage caused by impacts, ensuring timely intervention to maintain the functionality of the tunnel structure 102. The accelerometers measure the acceleration experienced by the tunnel structure 102. They help detect sudden movements or vibrations caused by collisions with space debris, providing valuable data for assessing the stability and alignment of tunnel structure 102. Gyroscopes may measure orientation and rotational movements of the tunnel structure 102. They are used for maintaining the alignment of the tunnel structure 102 and ensuring it remains properly oriented to capture and guide space debris. The temperature sensors monitor thermal conditions of the tunnel structure 102. They help detect any overheating or thermal stress that may affect the structural integrity and performance of the tunnel structure 102. The optical sensors such as cameras and LiDAR (Light Detection and Ranging), may provide visual monitoring of the surroundings of the tunnel structure 102. They help detect incoming debris and assess the alignment and operational status of the tunnel structure 102. The acoustic sensors may detect sound waves generated by impacts or structural vibrations. They provide additional data on the condition of the tunnel structure 102 and help identify potential damage or anomalies.

The proper implementation of these sensors 108-2 involves integrating them into the tunnel structure 102 and connecting them to the processor 120. The processor 120 processes the data collected by the sensors 108-2 and performs real-time analysis to assess the status of the tunnel structure 102.

Therefore, the integrated sensors 108-2 monitor the operational status and detect damage in the tunnel structure 102. By using a combination of sensors 108-2, the system 101 ensures that the tunnel structure 102 remains functional and effective in capturing and guiding space debris 126. The processor 120 processes the data from the sensor 108-2 and performs real-time analysis to maintain the structural integrity and alignment of the tunnel structure 102.

In an alternative embodiment, the thrusters 106-1*a*, 106-1*b*, and 106-1*c* are configured to de-orbit the tunnel structure 102 based on the detection of damage and operational status of the tunnel structure 102 as determined by the sensors 108-2. In addition to deployment, the thrusters 106-1*a*, 106-1*b*, and 106-1*c* are responsible for facilitating the de-orbiting of the tunnel structure 102 based on data provided by sensor 108-2. The sensors 108-2 continuously monitor the operational status of the tunnel structure 102 and detect any significant damage caused by space debris impacts. When the data given by sensor 108-2 indicates that the tunnel structure 102 has sustained damage or is no longer operationally effective, the processor 120 processes this information and triggers the de-orbiting sequence.

The thrusters 106-1*a*, 106-1*b*, and 106-1*c* are activated to alter the orbit of the tunnel structure 102, gradually reducing its altitude from GEO towards lower Earth orbit (LEO), graveyard orbit, or earth's atmosphere. This de-orbiting process involves precise calculations and controlled burns of the thrusters to ensure a safe and predictable descent trajectory. The goal is to guide the tunnel structure 102 into an orbit where atmospheric drag will increase, further slowing its descent and ensuring it burns up upon re-entry into the Earth's atmosphere. This controlled de-orbiting prevents the tunnel structure 102 from becoming additional space debris and ensures its safe disposal.

In addition to the de-orbiting based on sensor 108-2 data indicating damage or operational failure, the thrusters 106-1a, 106-1b, and 106-1c are also configured to de-orbit the tunnel structure 102 after a predetermined operational period, such as may be for 25 years. This feature ensures that the tunnel structure 102 is responsibly removed from orbit regardless of its condition, contributing to the long-term sustainability of space operations. After the specified operational period, the processor 120 may trigger the thrusters 106-1a, 106-1b, and 106-1c to initiate the de-orbiting sequence. The thrusters 106-1a, 106-1b, and 106-1c activated to alter the tunnel's orbit, gradually reducing its altitude from geostationary orbit (GEO) to lower Earth orbit (LEO). This controlled de-orbiting process ensures that the tunnel 102 encounters increased atmospheric drag, further decelerating it and facilitating its safe re-entry and destruction in the Earth's atmosphere. This time-based de-orbiting feature prevents the tunnel structure 102 from becoming additional space debris and ensures that its end-of-life disposal is managed in a controlled and predictable manner.

In addition to time-based de-orbiting and sensor-triggered de-orbiting due to damage or operational failure, the thrusters 106-1a, 106-1b, and 106-1c also feature an automatic de-orbiting protocol that activates when there is a significant change in the structural integrity of the tunnel structure 102. The sensors 108-2 continuously monitor the structural integrity of the tunnel structure 102, detecting deformations, cracks, or any signs of severe weakening. When the sensors 108-2 identify a critical change in the structural integrity of the tunnel structure 102, the processor 120 immediately triggers the thrusters 106-1a, 106-1b, and 106-1c to initiate the de-orbiting process. The thrusters 106-1a, 106-1b, and 106-1c are activated to adjust the tunnel's orbit, gradually lowering its altitude from geostationary orbit (GEO) to lower Earth orbit (LEO). This controlled descent ensures that the tunnel experiences increased atmospheric drag, which decelerates it and leads to its safe re-entry and destruction in the Earth's atmosphere. By implementing this feature, the system 101 ensures that any structurally compromised tunnel is responsibly removed from orbit, preventing it from becoming a hazard to other space assets and maintaining the sustainability of space operations.

In an alternative embodiment, the system 101 comprises the thrusters 106-1a, 106-1b, and 106-1c configured to deploy the tunnel structure 102 into space. The thrusters 106-1a, 106-1b, and 106-1c enable the deployment of the tunnel structure 120 into space and facilitate its de-orbiting based on data from the sensor 108-2. For deployment, the thrusters 106-1a, 106-1b, and 106-1c are tasked with positioning the tunnel structure 102 in the desired orbit, typically a geostationary orbit (GEO). This deployment is achieved using a combination of chemical and electric thrusters. Initially, chemical thrusters provide the high thrust necessary to propel the tunnel structure 102 from the launch vehicle into space, overcoming earth's gravitational pull to achieve the desired altitude. Once the tunnel structure 102 reaches a sub-orbital trajectory, the thrusters 106-1a, 106-1b, and 106-1c transition to electric thrusters, such as ion or Hall effect thrusters, for precise control and efficient low-thrust propulsion. These electric thrusters allow for careful adjustments to the trajectory of tunnel structure 102, ensuring it reaches and maintains its geostationary orbit.

The deployment process of the tunnel structure 102 may be controlled by the navigational sensors, gyroscopes, and accelerometers. These components may continuously monitor position, orientation, and velocity of the tunnel structure 102, providing real-time data to the processor 120. The processor 120 processes this information and executes the necessary adjustments to the thrusters 106-1a, 106-1b, and 106-1c, ensuring a smooth and accurate deployment. The thrusters 106-1a, 106-1b, and 106-1c must account for various orbital parameters, such as inclination, eccentricity, and longitude of the ascending node, to precisely position the tunnel structure 102 in its optimal orbit for space debris capture.

Once deployed, the role of the thrusters 106-1a, 106-1b, and 106-1c shifts in maintaining and adjusting the orbit of the tunnel structure 102 as needed. This includes orbital adjustments to optimize the position of tunnel structure 102 for debris capture. The combination of chemical and electric thrusters allows for efficient propulsion and fine-tuning of the position of the tunnel structure 102.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steppers may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A tunnel-based space debris removal system, comprising:

a tunnel structure having a wide opening at a first end configured to receive space debris, a closed second end, and a curved funnel-shaped portion between the first and second ends;

a debris detection mechanism comprising radar units positioned along a midsection and nose of the tunnel structure, one or more optical imaging devices including wide-angle and telescopic cameras, and a communication relay unit configured to receive orbital tracking data from ground-based sensor facilities, the debris detection mechanism being configured to determine trajectory and orbital velocity of the space debris;

a rear-approach capture mechanism operatively coupled to the debris detection mechanism and configured to:

receive information associated with the trajectory and orbital velocity of the space debris;

calculate an intercept path of the tunnel structure that matches the trajectory and orbital velocity of the debris; and control one or more thrusters to position the tunnel structure along the trajectory of the space debris and approach the space debris from behind so as to minimize relative velocity between the space debris and the tunnel structure prior to capture of the space debris in the tunnel structure;

an orientation control subsystem comprising a plurality of control moment gyroscopes (CMGs) positioned on multiple sides of the tunnel structure, the orientation control subsystem being configured to reorient the tunnel structure toward the determined trajectory of the space debris;

an electromagnetic tungsten dust brake subsystem comprising:

a tungsten alloy dust storage container, an electromagnetic dispersal unit configured to project tungsten dust into the trajectory of the space debris, and an electromagnetic recovery unit configured to recapture dispersed tungsten dust, the dust brake subsystem being configured to reduce velocity of the space debris prior to entry into the curved funnel-shaped portion;

a multi-layer deceleration and capture assembly disposed downstream of the first end, wherein the multi-layer deceleration and capture assembly comprises:

an electromagnetic foil dispenser configured to wrap the space debris with a foil, and a collision box having a closed rear wall towards the second end of the tunnel structure and configured to bring the space debris wrapped with the foil to a complete stop upon impact;

a hydraulic compaction mechanism positioned adjacent to the collision box and configured to compress the stopped space debris into dense pellets;

an ejection subsystem configured to direct the dense pellets in a selected direction for disposal or to generate propulsion, the ejection subsystem comprising at least one launch device and a mounting arrangement allowing adjustment of an ejection trajectory of the dense pellets; and a power subsystem comprising solar panels mounted on an exterior surface of the tunnel structure and energy storage devices integrated with the tunnel structure, the power subsystem being configured to provide operating power to the debris detection mechanism, the orientation control subsystem, the electromagnetic tungsten dust brake subsystem, the multi-layer deceleration and capture assembly, the hydraulic compaction mechanism, and the ejection subsystem.

2. The tunnel-based space debris removal system of claim 1, further comprising a processor configured to execute a trained machine learning (ML) model using the trajectory and orbital velocity of the space debris to determine an orientation of the tunnel structure for capture of the space debris and to determine a reorientation of the tunnel structure after ejection of the compressed debris so as to direct the compressed debris toward a lower orbit.

3. The tunnel-based space debris removal system of claim 1, wherein the launch device comprises at least one railgun launcher including two parallel conductive rails, the at least one railgun launcher being mounted to an adaptive gun platform having at least two degrees of rotational freedom to aim the dense pellets toward a specific trajectory.

4. The tunnel-based space debris removal system of claim 1, wherein the orientation control subsystem comprises one or more sensors configured to detect a size of the space debris, the orientation control subsystem is further configured to compare the detected size and the velocity of the space debris with predetermined threshold values, and, when at least one of the detected size and the velocity exceeds the predetermined threshold values, inhibit initiation of the capture of the space debris.

5. The tunnel-based space debris removal system of claim 4, further comprising an iris-type shutter mechanism positioned at the first end of the tunnel structure and configured to selectively close the first end to prevent debris entry when the at least one of the detected size and the velocity exceeds the predetermined threshold values.

6. The tunnel-based space debris removal system of claim 1, wherein the ejection subsystem comprises at least one chemical thruster for directing the compressed debris in the selected direction.

7. The tunnel-based space debris removal system of claim 1, wherein the mounting arrangement of the ejection subsystem is configured to rotate the at least one launch device up to 360 degrees vertically or horizontally.

8. The tunnel-based space debris removal system of claim 1, wherein the collision box comprises an internal lining formed of shock-absorbing material to dissipate kinetic energy of the space debris upon impact.

9. The tunnel-based space debris removal system of claim 1, wherein the hydraulic compaction mechanism comprises a pneumatically-driven arm configured to press the space debris.

10. The tunnel-based space debris removal system of claim 1, wherein the electromagnetic tungsten dust brake subsystem is configured to control dispersion pattern, timing, and field polarity of the tungsten dust based on a size and the velocity of the space debris.

11. The tunnel system of claim 1, further comprising sensors integrated with the tunnel structure to detect damage to the tunnel structure.

12. The tunnel system of claim 11, further comprising the one or more thrusters configured to de-orbit the tunnel structure based on the detection of damage of the tunnel structure by the sensors.

13. The tunnel system of claim 11, further comprising the one or more thrusters configured to de-orbit the tunnel structure after a predetermined operational period post deployment of the tunnel structure into the space.

14. The tunnel system of claim 1, further comprising the one or more thrusters configured to deploy the tunnel structure into the space.

* * * * *